(No Model.)  3 Sheets—Sheet 1.
F. J. G. FROMHOLT.
ROTARY BORER WITH DIAMOND BIT.
No. 530,408.  Patented Dec. 4, 1894.
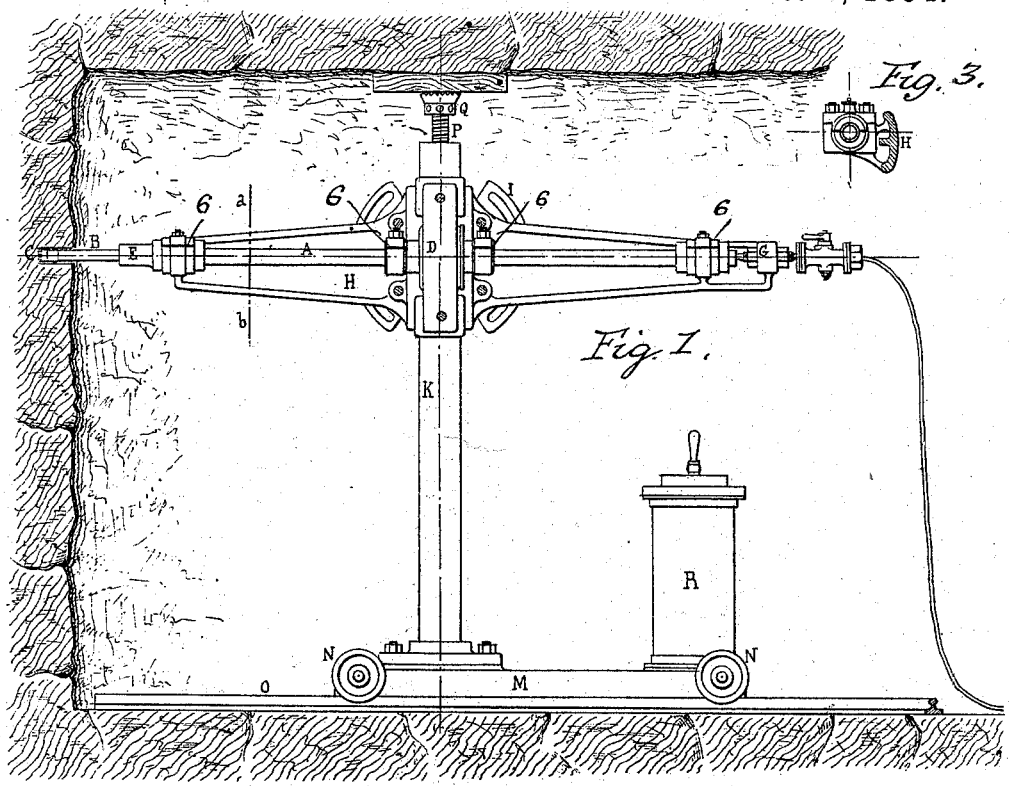
Fig. 1.
Fig. 3.
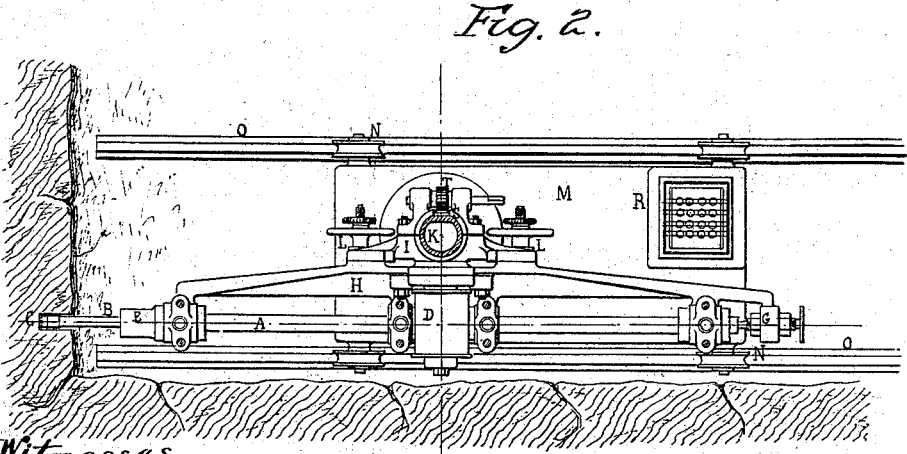
Fig. 2.
Witnesses  Inventor.

(No Model.) 3 Sheets—Sheet 2.
F. J. G. FROMHOLT.
ROTARY BORER WITH DIAMOND BIT.
No. 530,408. Patented Dec. 4, 1894.
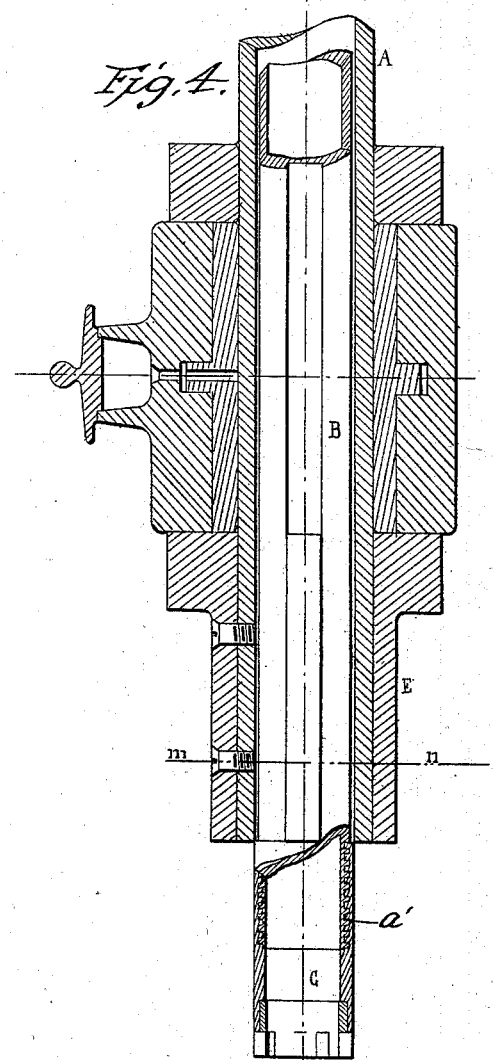
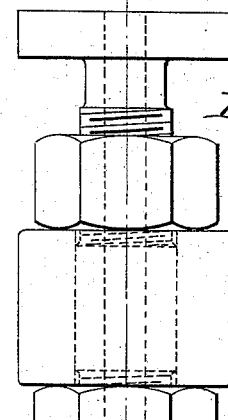
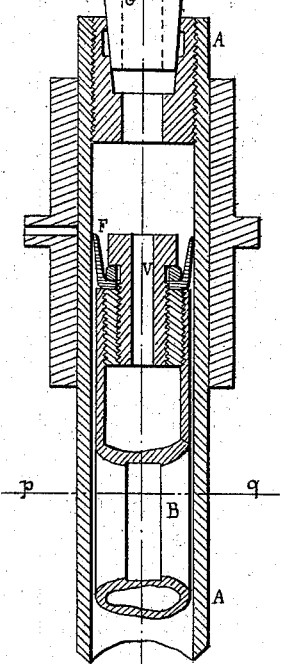
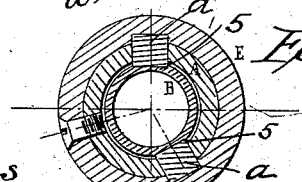
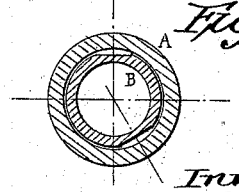
Witnesses Inventor

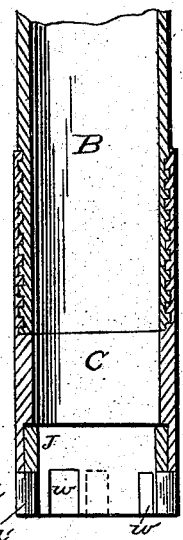
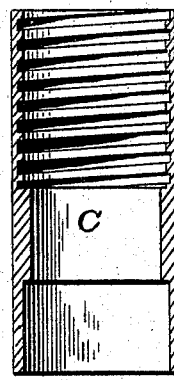
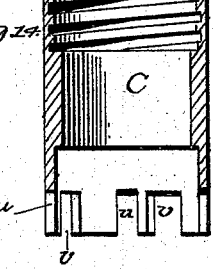
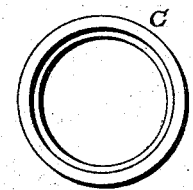
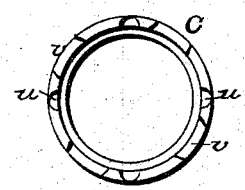
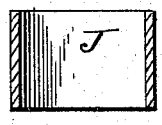
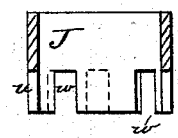
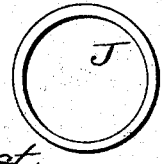
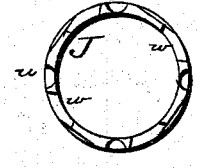
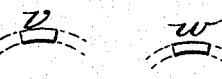

UNITED STATES PATENT OFFICE.

FÉLIX JULES GRÉGOIRÉ FROMHOLT, OF PARIS, FRANCE.

ROTARY BORER WITH DIAMOND BIT.

SPECIFICATION forming part of Letters Patent No. 530,408, dated December 4, 1894.

Application filed September 8, 1893. Renewed November 2, 1894. Serial No. 527,768. (No model.) Patented in France February 15, 1892, No. 219,402.

*To all whom it may concern:*

Be it known that I, FÉLIX JULES GRÉGOIRÉ FROMHOLT, mechanical constructor, of Paris, in the Republic of France, have invented a new Rotatory Borer with Diamond Bits; (for which I have obtained Letters Patent of France for fifteen years, No. 219,402, dated February 15, 1892;) and I do hereby declare that the following is a full and exact description thereof, reference being made to the accompanying drawings.

In the drawings, Figure 1, is a side view of the boring machine in place in the mine. Fig. 2, is a plan view of the same; Fig. 3, a detail relating to the frame. Fig. 4, represents in section the boring bit and the hollow shafting for operating the same. Fig. 5, is a similar view of the shafting showing the connection for giving it longitudinal movement. Figs. 6, 7 and 8 are detail views showing transverse sections of Figs. 4 and 5. Fig. 9, is a sectional view of the outer tube of the bit carrier before the recesses are formed therein for the diamond holders. Fig. 10, is a plan view of the same. Fig. 11, is a sectional view of the inner ring or tube of the bit before the sockets are formed therein for receiving the diamond pieces. Fig. 12, is a plan view of the same. Figs. 13 and 14 show an outer tube detached from its carrying tube which is also shown in section, Fig. 14, showing also the recesses formed in the outer tube for the diamond holder. Fig. 15, is a plan view of Fig. 14. Fig. 16, is a sectional view of the inner tube or sleeve as complete. Fig. 17, is a plan view of the same. Fig. 18, shows the several parts in place and in section. Fig. 19, is a plan view of the same with the diamond holders in section, and Figs. 20 and 21 are details of the diamond pieces.

This borer comprises four parts as follows: first, the diamond bit; second, the borer; third, the motor, and fourth, the frame and its carriage.

*The bit.*—The bit C (in the accompanying drawings) is composed of two concentric tubes (Figs. 4 and 6), which allow of bringing together the soldered or riveted pieces of metal which carry the diamonds.

The arrangement allows of using diamonds of small size, of bringing all the points out on the section of the bit, and of easily replacing the metallic pieces, which carry the diamonds.

It will be noticed that the outer tube of the diamond bit C Figs. 14, 15, is formed with inwardly flaring dovetailed sockets $v$ to receive the diamond holders V, Fig. 20, and also the semicircular sockets $u$ to receive cylindrical diamond holders $u'$. The inner ring or sleeve J, Figs. 16 and 17 has corresponding semicircular sockets to register with the sockets $u$ for holding the diamond piece $u'$ and the outwardly flaring sockets to receive the diamond holders or pieces $w$, Figs. 19, 21. By this arrangement the diamond pieces $u'$ are retained between the two rings or tubes and the pieces V are also held by these two tubes, the pieces V $w$ being retained in the tube C by the tube J and the pieces $w$ retained in the tube J by the tube C.

*The borer.*—The borer comprises two concentric tubes A and B (Figs. 4 and 7). The inner tube B carries the bit C screwed at $a'$ to one of its ends. It turns with the outer tube A and slides in it. For that purpose a socket E fixed by means of a screw to the tube A, carries two keys $a$ which pass through this tube A and support the inner tube B. The latter is provided with two grooves 5 throughout its entire length, whereby it can glide in the fixed keys and rotate with the outer tube A. At its other end (Figs. 5 and 8) the inner tube B is provided with a piece of ferruled leather F, which makes a joint in the outer tube A. The forward movement is obtained by water pressure fed by the fitting G on the said leather piece. At the center of the piece carrying the leather F is bored a hole V, which gives passage to the water necessary for cooling down the bit and for washing the hole.

*The motor.*—The movement in the working parts, which are permanently fixed, can be obtained either by cable or belts. For use in a mine gallery or for apparatus intended to be moved, the motive power is got by the help of a dynamo-electrical engine D, the armature of which is supported on the outer tube A (Figs. 1 and 2). This motor, placed in the center of the length of the tube A operates direct and without transmission and at the required speed the turning or rotation of the bit.

*The frame and its carriage.*—The frame H carries four points of support or bearings 6 in which the tube A rotates, and the shoe of the dynamo-electrical machine D. So these three pieces form a whole.

The frame H (Figs. 1 and 2) is mounted in trunnions on a carriage I on which it can incline, the tightening screws L allowing of its being fixed in the required position.

The carriage I, in two parts, is clamped on a cylindrical pillar K on which it can be raised or lowered by means of the rack S and the pinion T controlled by a crank-arm.

For apparatus having a large diameter, the pillar K, which serves as a support, can be replaced by two or more pillars connected together so as to render the apparatus more stable.

The carriage M carries also the rheostat R for the starting of the dynamo-motor. It moves on the rails O by means of rollers N. A screw P and nut Q serve for tightening the pillar against the top of the gallery of the mine, and of fixing it in position. This pillar K can, besides, be removed from the carriage and arranged horizontally in tightening it between the side walls of the gallery.

I claim—

1. A boring bit comprising two concentric rings having sockets extending between them longitudinally and opening at the lower face of the rings and the diamond points carried by and between the rings in the longitudinal sockets, said points projecting out in the plane of the line of division between the rings, substantially as described.

2. In combination the two concentric rings, one of them having sockets formed therein extending longitudinally between the meeting faces and flaring radially and the diamond carrying pieces arranged in said sockets and held by the adjacent rings, substantially as described.

3. In combination, the outer tube A held against longitudinal movement, the bit, the carrier therefor arranged within the outer tube and having a piston head, said carrier being splined to the interior of the outer tube, the means for rotating the bit connected to the outer tube to rotate it and thus transmit rotary movement to its splined carrier and bit and the liquid supply leading to the outer tube whereby said outer tube will serve as the means of transmitting the rotary movement to the carrier and as the cylinder therefor, substantially as described.

4. In combination, the frame comprising the standard K, and the bearings 6, the tubular part A in said bearings, the motor D on the shaft to rotate the same, the said part A being held with the rotary driving means against longitudinal movement the drill, the part carrying the same sliding in the outer rotary part A and splined to the interior thereof to rotate with the same, the piston on the inner part, and the liquid supply fitting G at the end of the rotary tube A, substantially as described.

5. In combination, the post K, the split frame I embracing the same and having a pinion engaging a rack on the post, said frame I being made in two sections, the frame H carried by the split frame I and having bearings for supporting the rotary shaft the said frame being adjustable on the split frame by the screws L, the bit and the electric motor on the rotary shaft, substantially as described.

In witness whereof I have hereunto set my hand in presence of two witnesses.

FÉLIX JULES GRÉGOIRÉ FROMHOLT.

Witnesses:
GEORGE LAURENT,
EUGÉNE WATTICE.